US012308164B2

(12) United States Patent
Perumalla et al.

(10) Patent No.: US 12,308,164 B2
(45) Date of Patent: May 20, 2025

(54) RETRACTABLE DISPLAYS

(71) Applicant: International Business Machines Corporation, Armonk, NY (US)

(72) Inventors: Saraswathi Sailaja Perumalla, Visakhapatnam (IN); Venkata Vara Prasad Karri, Visakhapatnam (IN); Sarbajit K. Rakshit, Kolkata (IN); Sheema Farheen, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 1093 days.

(21) Appl. No.: 17/211,297

(22) Filed: Mar. 24, 2021

(65) Prior Publication Data

US 2022/0308635 A1 Sep. 29, 2022

(51) Int. Cl.
| | |
|---|---|
| *G06F 1/16* | (2006.01) |
| *G06F 1/18* | (2006.01) |
| *G06N 5/04* | (2023.01) |
| *H01F 7/08* | (2006.01) |
| *H01F 7/124* | (2006.01) |
| *H01F 7/18* | (2006.01) |
| *H01F 7/16* | (2006.01) |

(52) U.S. Cl.
CPC ........... *H01F 7/1844* (2013.01); *G06F 1/163* (2013.01); *G06F 1/1637* (2013.01); *G06F 1/1679* (2013.01); *G06F 1/189* (2013.01); *G06N 5/04* (2013.01); *H01F 7/088* (2013.01); *H01F 7/124* (2013.01); *H01F 7/16* (2013.01)

(58) Field of Classification Search
CPC ........ H01F 7/1844; H01F 7/088; H01F 7/124; H01F 7/16; G06F 1/163; G06F 1/1637; G06F 1/1679; G06F 1/189; G06F 1/1656; G06N 5/04; G06N 20/00
See application file for complete search history.

(56) References Cited

U.S. PATENT DOCUMENTS

| | | | | |
|---|---|---|---|---|
| 8,181,881 | B2 | 5/2012 | Pedicano | |
| 8,872,448 | B2* | 10/2014 | Boldyrev | H04M 1/185 |
| | | | | 318/128 |
| 8,896,995 | B2* | 11/2014 | Shedletsky | F16F 7/108 |
| | | | | 345/174 |
| 9,571,150 | B2* | 2/2017 | Sanford | H04M 1/185 |
| 9,606,654 | B2* | 3/2017 | Li | G06F 1/1694 |
| 9,612,622 | B2* | 4/2017 | Moon | H02H 6/00 |
| 9,715,257 | B2* | 7/2017 | Manullang | G06F 1/1626 |
| 9,758,095 | B2 | 9/2017 | Briggs et al. | |
| 10,152,028 | B2* | 12/2018 | Kim | G04G 21/08 |
| 10,511,699 | B2* | 12/2019 | Zeng | G06F 1/1652 |
| 10,715,645 | B2* | 7/2020 | Wilson | G06F 1/1633 |
| 11,051,412 | B2* | 6/2021 | Zeng | G06F 1/1656 |

(Continued)

FOREIGN PATENT DOCUMENTS

| | | |
|---|---|---|
| CN | 106174923 A | 12/2016 |
| WO | 2020041715 A1 | 2/2020 |

*Primary Examiner* — Rockshana D Chowdhury
(74) *Attorney, Agent, or Firm* — Yee & Associates, P.C.

(57) ABSTRACT

A device's display can be moved based on sensor data to protect the display. The display can be moved via springs and/or electromagnets. The display can be moved into a safe recessed position, allowing a frame to absorb impacts that might otherwise damage the display. The display can also be moved back out of the recessed position.

20 Claims, 6 Drawing Sheets

(56) References Cited

U.S. PATENT DOCUMENTS

| | | | |
|---|---|---|---|
| 2011/0279961 A1* | 11/2011 | Shedletsky | F16F 7/1028 |
| | | | 361/679.01 |
| 2013/0021881 A1 | 1/2013 | Bertucci | |
| 2017/0248922 A1 | 8/2017 | Hynecek | |
| 2019/0368608 A1 | 12/2019 | Chen | |
| 2021/0286323 A1* | 9/2021 | Patnaikuni | G04G 21/025 |

* cited by examiner

RETRACTABLE DISPLAYS

BACKGROUND

The systems and methods of the present disclosure relate to wearable display devices.

Wearable display devices, such as smartwatches, are electronic devices that are typically designed to be worn on a user's person. For example, smartwatches are often worn on a user's wrist, adding convenient access to the device. Many wearable devices can be connected to other user devices such as a smartphone via various communication protocols such as Bluetooth.

Displays are relatively fragile, susceptible to cosmetic damage such as scratches and cracks. Thus, users often keep display devices in protective cases or covers in order to preserve the display.

SUMMARY

Some embodiments of the present disclosure can be illustrated as a method. The method comprises monitoring an environment of a device. The device includes a display. The display is in an exposed configuration. The method further comprises detecting, based on the monitoring, a danger to the display. The method further comprises retracting, based on the detecting, the display into a recessed configuration in a body of the device.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
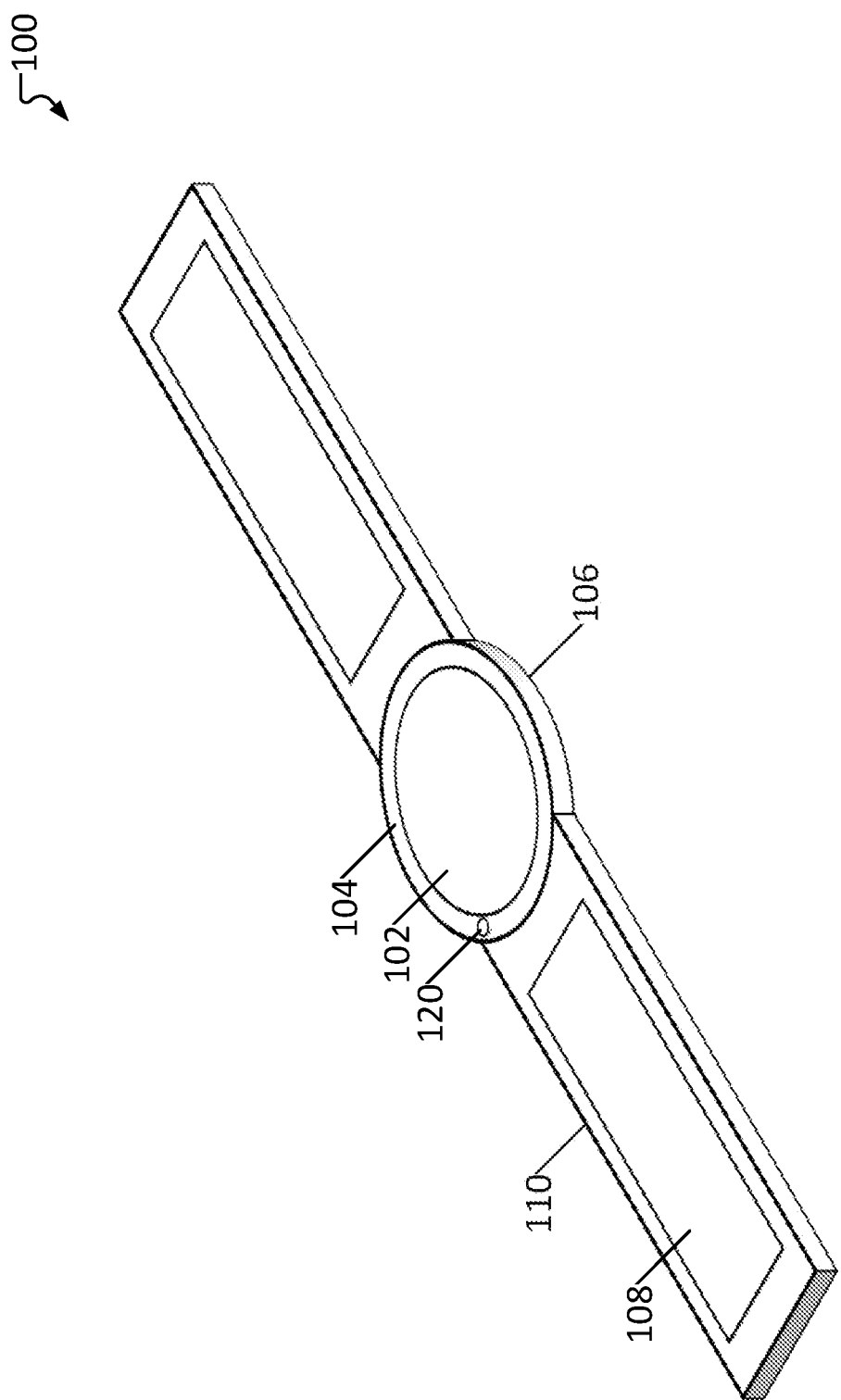
FIG. 1 is a diagram of an example wearable display device capable of retracting a display to protect it, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to retract and extend electronic displays. More particular aspects relate to a system to retracting and extending a display of a wearable device into and out of a body of the device.

Wearable devices such as smartwatches provide convenient access to electronic device features. For example, smartwatches, being worn on a user's wrist, enable a user to view an incoming message without needing to remove a smartphone from the user's pocket. However, these devices can often be relatively fragile, having displays susceptible to damage such as scratches.

Some device designers attempt to rectify this by improving sturdiness, using stronger materials, etc. However, many approaches to strengthening smartwatches result in aesthetic differences that many consumers dislike.

Systems and methods consistent with the present disclosure provide for reconfigurable wearable devices, enabling retracting/extending displays automatically and/or on demand. The displays may be biased to default to a retracted state or to an extended state, depending upon user settings and/or embodiment. For example, a display might be in a retracted, protected position by default until the system detects that the user wishes to view the display, at which point the display may automatically be extended. On the other hand, a display might be in an extended position by default until the system detects that the display is in danger, at which point the display may be automatically retracted. Further, a user may be able to manually control the default state of the display and/or the current state of the display. While the display may only translate by relatively short distances (e.g., less than a centimeter), being surrounded by a raised frame provides substantially improved protection. The frame may not move relative to the user or a body of the wearable device, but the movement of the display causes the frame to be in a raised position relative to the display.

FIG. 1 is a diagram of an example wearable display device 100 capable of retracting a display to protect it, consistent with several embodiments of the present disclosure. Wearable device 100 may be, for example, a smartwatch. Wearable device 100 includes display 102 within a frame 104. Device 100 also includes band display 108 within band 110. Device 100 is configured to move display 102 into device body 106. With display 102 retracted within body 106, frame 104 can absorb impacts to protect display 102. Frame 104 may be concentric with respect to display 102, such that frame 104 surrounds display 102. In some embodiments, frame 104 may consist of a relatively hard and/or strong material such as, for example, titanium, aluminum, etc. In some embodiments, frame 104 may be an upper lip of body 106, while in other embodiments, frame 104 may be a separate component affixed to body 106.

Device 100 may also include button 120 to enable manual movement of display 102. In some embodiments, display 108 can also be retracted into band 110. Display 108 may be retracted in a similar manner to display 102. In some instances, display 108 may be retracted while display 102 may not be retracted. In some instances, display 102 may be retracted while display 108 may not be retracted. In some instances, both display 102 and display 108 may be retracted at the same time. Whether either or both of display 102 and display 108 are retracted may depend upon circumstance, such as which display is in danger. Additional displays on device 100 may also be retractable.

Figure 2A:
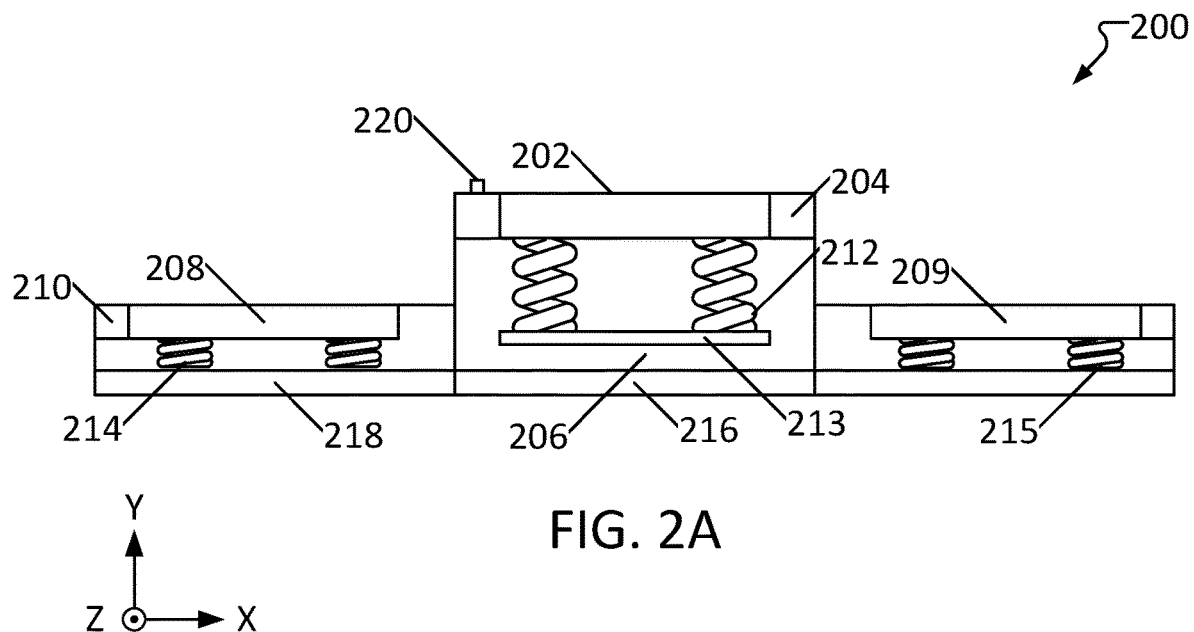
FIG. 2A is an elevation view of an example wearable display device in an "extended" configuration, consistent with several embodiments of the present disclosure.

FIG. 2A is an elevation view of an example wearable display device 200 enabled for protective retraction in an "extended" configuration, consistent with several embodiments of the present disclosure. Device 200 includes display 202 within frame 204. Display 202 may be biased out of body 206 via one or more springs 212. In other words, springs 212 may apply a spring force to press display 202 out of body 206 along a first axis (e.g., in a positive-Y direction) such that, when device 200 is at rest, display 202 may be in an "extended" configuration. Springs 212 may be anchored to plate 213, which may in turn be affixed to body 206. Springs 214 and 215 may also be anchored, though similar anchor plates are omitted from FIG. 2A and FIG. 2B for clarity.

Display 202 may be withdrawn (i.e., retracted) into body 206. This may occur upon detection of a danger to display 202, upon activation of a button or switch (such as button 220), etc. In order to retract display 202, electromagnet 216 may be activated. For example, electromagnet 216 may be a solenoid, activated by device 200 supplying electric current to electromagnet 216, resulting in a magnetic field that subjects display 202 to a net magnetic force. The net magnetic force applied to display 202 may be antiparallel to the first axis of the spring force (e.g., a direction of the magnetic force may be within 175° to 185° from the direction of the spring force, such as in a negative-Y direction). The magnetic force applied to display 202 may also be greater in magnitude to the spring force exerted by springs 212, resulting in display 202 being withdrawn into body 206.

In some embodiments, electromagnet 216 may be replaced by a different type of magnet (such as a permanent magnet). For example, electromagnet 216 may be replaced with a "reversible" magnet, comprised of a permanent magnet mounted on a gimbal which can be rotated (e.g., flipped over) on demand, effectively reversing the magnetic fields exerted by the reversible magnet.

Figure 2B:
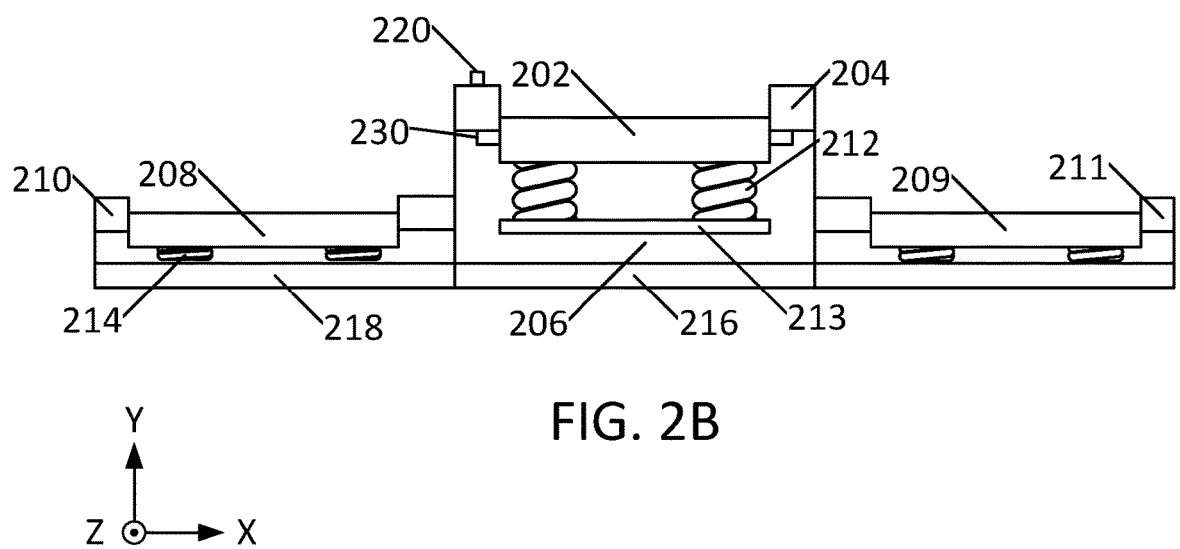
FIG. 2B is an elevation view of an example wearable display device in a "retracted" configuration, consistent with several embodiments of the present disclosure.

FIG. 2B is an elevation view of an example wearable display device 200 enabled for protective retraction in a "retracted" configuration, consistent with several embodiments of the present disclosure. As shown in FIG. 2B, display 202 has been retracted into body 206. Thus, should device 200 impact against a foreign object (a wall, a floor, etc.), frame 204 is more likely to absorb the impact and protect display 202.

Similarly, display 208 can be retracted into band 210 via electromagnet 218 and display 209 is retracted into band 211 via electromagnet 219. Electromagnets 218 and 219 may similarly exert downward magnetic forces to overcome spring forces of springs 214, 215.

Electromagnet 216 can hold display 202 in a recessed position, such as shown in FIG. 2B. However, supplying electric current to electromagnet 216 can result in substantial energy consumption. Thus, in some embodiments, once display 202 is in the recessed position, the display may be locked in place via one or more mechanical locks 230. For example, lock 230 may be a spring-loaded lock that is ordinarily contained within display 202, but upon display 202 being withdrawn into body 206, lock 230 may be pressed into the position shown in FIG. 2B. Thus, lock 230 may make contact with frame 204. As lock 230 may be affixed to display 202, this configuration may prevent display 202 from returning to the "extended" configuration shown in FIG. 2A. Lock 230 may be disengaged via, for example, a button press, an additional electromagnet (not shown in FIG. 2B), etc., in order to allow display 202 to return to the extended configuration. Similar locks may be utilized for displays 208 and 209. The locks may be disengaged in order to extend the displays, such as when a detected danger is no longer detected or has otherwise resolved.

In some embodiments, springs 212 may bias display 202 into the recessed position, wherein the electromagnetic force by the electromagnet may push the display into the extended position. For example, springs 212 may pull display 202 down into body 206, but electromagnet 216 may be configured such that, upon device 200 applying electric current to electromagnet 216, display 202 is subjected to a magnetic force that pushes display 202 up and out of body 206. This configuration may result in display 202 being in a protected state by default. In some embodiments, no springs may be utilized, and the display may be moved solely via locks and electromagnets. For example, electromagnet 216 may, upon receiving electric current, push display 202 up out of body 206, wherein lock 230 may engage and keep display 202 in the "extended" configuration. Further, device 200 may be capable of applying reversed electric current to electromagnet 216, which may cause electromagnet 216 to apply a magnetic force to display 202 to pull display 202 down into body 206, wherein lock 230 may engage and keep display 202 in the "protected" configuration. In some embodiments, one or more retention springs or cable may be implemented to prevent the display from being ejected from a body of the device.

Figure 3:
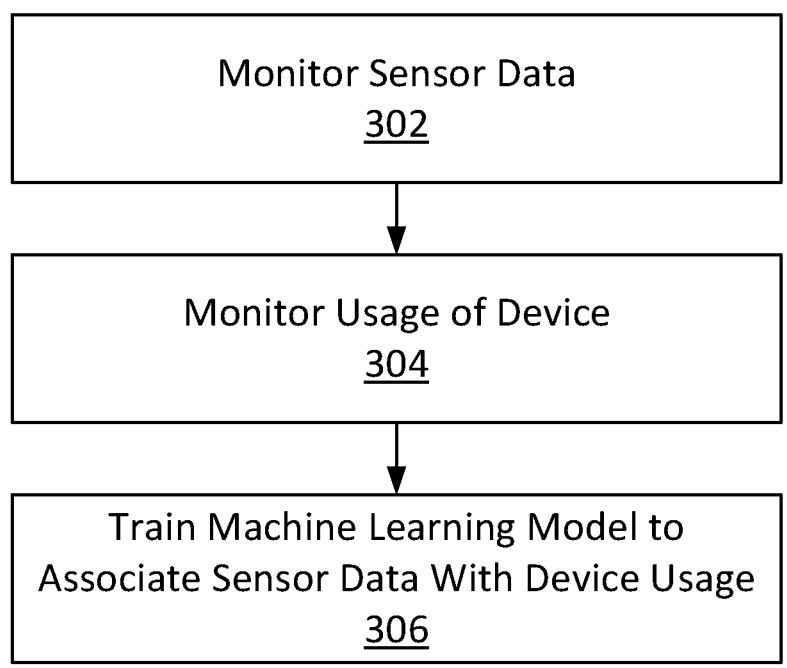
FIG. 3 is a method for training a machine learning model to associate sensor data with usage of a device, consistent with several embodiments of the present disclosure.

FIG. 3 is a method 300 for training a machine learning model to associate sensor data with usage of a wearable device, consistent with several embodiments of the present disclosure. Method 300 comprises monitoring sensor data at operation 302. Operation 302 may include monitoring motion of a wearable device via, for example, collecting data from one or more sensors such as accelerometers, gyroscopes, etc. In addition or alternatively, operation 302 may include monitoring location data, audio data, time of day etc. The sensor data may be recorded with respect to time. For example, operation 302 may include identifying patterns associated with motion of the device, etc.

Method 300 further comprises monitoring usage of the device at operation 304. Operation 304 may include, for example, flagging when the device is awakened and/or otherwise interacted with by a user. The usage data may be recorded with respect to time.

Method 300 further comprises training a machine learning model to associate motions of the device with usage of the device at operation 306. Operation 306 may include, for example, utilizing the motion data collected at operation 302 and the usage data collected at operation 304 as training datasets to a machine learning model. The machine learning model may be trained to predict usage of the device based on motions of the device. As an example, operation 306 may include inputting sensor data into a machine learning model, receiving an output that includes a prediction of whether a user is about to utilize a wearable device, determining whether the user utilized the device, and revising the machine learning model based on a comparison between the prediction and the monitored usage data.

The sensor data can also enable the machine learning model to associate location or time of day patterns with usage of the device. For example, sensor data acquired at operation 302 may be combined with usage data acquired at operation 304 to determine that the device is seldom used between the hours of 10:00 PM and 6:00 AM (such as when the user may be sleeping). As an additional example, an example system may leverage sensor data and usage data to determine that the device is seldom used when the device is moving quickly (such as when a user is engaging in sports activities, etc.) or within a given time window (such as when the user may be working).

Figure 4:
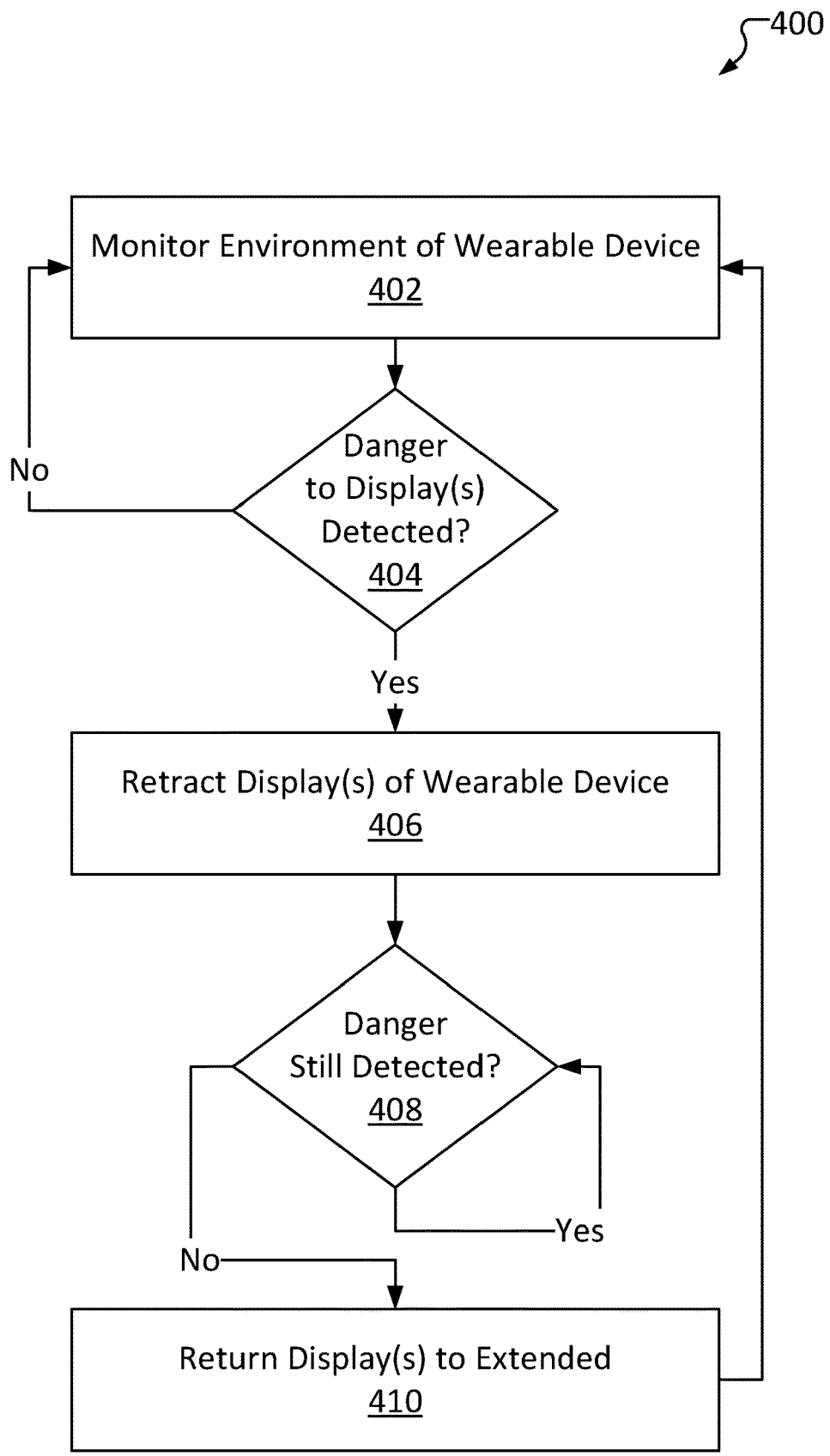
FIG. 4 is a high-level method for retracting displays of a wearable display device, consistent with several embodiments of the present disclosure.

FIG. 4 is a high-level method 400 for retracting displays of a wearable display device, consistent with several embodiments of the present disclosure. Method 400 depicts a "default extended" mode of operation of a wearable display device. Default extended modes may be desired by many users, as the extended configuration may be more aesthetically pleasing (for example, the display may be flush/level with the frame). Method 400 comprises monitoring an environment of a wearable device at operation 402. Operation 402 may include, for example, receiving information from one or more sensors included in the wearable device. The sensors may include, for example, accelerometers, gyroscopes, thermometers, radar, lidar, etc. In some embodiments, the monitoring may be performed by devices other than the wearable device itself. For example, in some embodiments, a smartwatch's environment may be monitored by sensors embedded within a smartphone, wherein the smartphone may maintain a connection with the smartwatch regarding the environment. In some embodiments, a smartwatch may be in communication with a smart vehicle while a wearer is in the vehicle, wherein upon detection of an imminent collision, the smart vehicle may transmit a signal to the smartwatch to indicate that the collision is imminent.

Method 400 further comprises determining whether a danger to display(s) of the wearable device has been detected at operation 404. A "danger" represents a risk that the displays may be scratched, damaged and/or rendered inoperable. Operation 404 may include, for example, detecting that a wearer of the wearable device is experiencing sudden motion, such as falling down, being involved in a motor vehicle accident, etc. Operation 404 may leverage the sensor data acquired at operation 402. For example, in some instances, operation 404 may include detecting (such as via proximity sensors and accelerometer data) that the wearable device is in danger of colliding with an object, such as a wall, desk, doorframe, etc. In some instances, operation 404 may include detecting, via location data, that a wearer of the wearable device is engaged in an activity that poses a greater risk to the display(s) of the device. For example, operation 404 may include detecting that a user has entered a crowded area or room. As an additional example, operation 404 may include determining that a GPS position of the device (determined at operation 402) indicates that the device is in a frequently-crowded area, such as a shopping center.

If no danger is detected (404 "No"), method 400 continues to monitor by returning to operation 402. If a danger is detected (404 "Yes"), method 400 further comprises retracting displays of the wearable device at operation 406. Operation 406 may include, for example, powering an electromagnet, resulting in an electromagnetic force pulling the display into a body of the wearable device. The motion of the display may cause a mechanical lock to engage. This means that, in some embodiments, the wearable device may only need to power the electromagnet briefly, reducing required battery consumption. In other embodiments, this means that the wearable device may be able to reduce the power to the electromagnet after the mechanical lock has been engaged.

Method 400 further comprises determining whether a danger is still detected at operation 408. Operation 408 may include, for example, continuing to monitor sensor data. In some instances, operation 408 may be based upon a nature of the danger detected at operation 404. For example, if, at operation 404, the detected danger was an imminent collision with an object based on proximity and motion sensor data, operation 408 may include determining whether the wearable device is still near the detected object, whether the wearable device has moved away from the object, etc. In some instances, operation 408 may compare a time elapsed since the display was retracted to a minimum threshold at operation 406. For example, in some instances, a detected danger is assumed to still be present for at least 5 seconds. In some instances, operation 408 may account for time elapsed since no danger is detected; for example, operation 408 may include determining whether a minimum threshold of time (e.g., 5 seconds) has elapsed since the device moved away from an object that the device was previously about to collide with. This threshold may vary depending upon use case and/or danger. For example, a first detected danger of an imminent collision with an object may be assumed to remain present for a relatively short period of time such as 5 seconds, while a second detected danger of a user entering a crowded area may be assumed to remain present for a relatively long period of time such as 30 seconds. The shorter threshold enables the device to return to an extended configuration (which users may prefer for aesthetic reasons) with minimal risk, as a risk of collision may be resolved in less than 5 seconds. For dangers that are less likely to resolve quickly, such as a user wearing the device through a crowded area, the display may remain retracted for a longer period. Operation 408 may include detecting new dangers while the display is retracted.

If a danger is still detected (408 "Yes"), method 400 continues to monitor at operation 408, leaving the display retracted. If no danger is detected (408 "No") and/or if a preset amount of time has elapsed since a danger has been resolved, method 400 further comprises returning the display(s) to an extended state at operation 410. Operation 410 may include, for example, powering an electromagnet to apply, to the display, a magnetic force that is greater than a retaining spring force. In some instances, operation 410 may include unpowering an electromagnet to allow a set of springs to move the display. In some instances, operation 410 may include disengaging a mechanical lock, such as by powering an electromagnet to actuate the lock. The display may then naturally be pushed back into the "extended" configuration via, for example, a spring force of one or more springs. In some embodiments, the mechanical lock may be disengaged by a user, such as by pressing a button on the device.

In some instances, even if a danger is still detected, the device may be extended if a user attempts to view the display in spite of the detected danger. In some instances, a detected danger may override a user attempting to view the display, resulting in the display being retracted in spite of the user actively utilizing the display.

Figure 5:
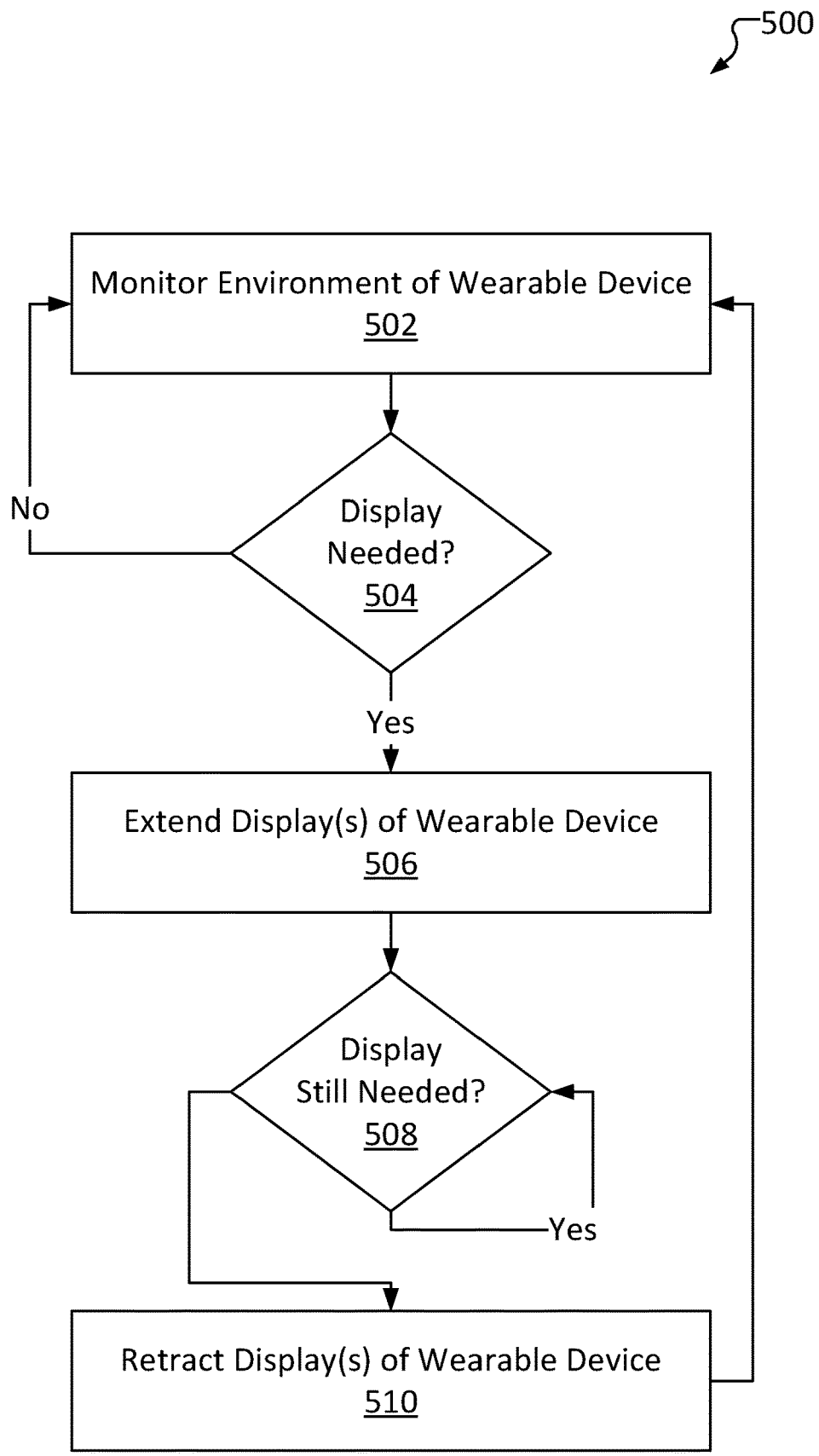
FIG. 5 is a high-level method for extending displays of a wearable display device, consistent with several embodiments of the present disclosure.

FIG. 5 is a high-level method 500 for extending displays of a wearable display device, consistent with several embodiments of the present disclosure. Method 500 depicts a "default recessed" mode of operation of a wearable display device. A default recessed mode of operation may be preferable, for example, to enhance protection of a display of the device. A user may set a device into a "default recessed" mode of operation prior to engaging in physical activity, etc. Method 500 comprises monitoring an environment of a wearable device at operation 502. Operation 502 may include, for example, receiving information from one or more sensors included in the wearable device. The sensors may include, for example, accelerometers, gyroscopes, thermometers, radar, lidar, etc. In some embodiments, the monitoring may be performed by devices other than the wearable device itself. For example, in some embodiments, a smartwatch's environment may be monitored by sensors embedded within a smartphone, wherein the smartphone may maintain a connection with the smartwatch regarding the environment. In some instances, a wearable device may be configured to vibrate and/or activate a display upon a variety of triggers, such as a user's smartphone receiving a notification, a step counter milestone being achieved, etc. Operation 502 may include monitoring for one of these triggers.

Method 500 further comprises determining whether a display of the device is needed at operation 504. Operation 504 may include, for example, determining whether a user is attempting to view a display of the device, detecting that a trigger associated with activating the display has occurred (such as receipt of a notification, etc.). As an example, operation 504 may include a smartwatch detecting, via accelerometer/gyroscope data, that the user's arm has been moved in a typical "looking at a wristwatch" motion, suggesting that the user wishes to view a display of the smartwatch. As an additional example, operation 504 may leverage a machine learning model output to determine that a device is about to be utilized. For example, the sensor data gathered via operation 502 may be input to a machine learning model, wherein a resulting output of the machine learning model may indicate a likelihood of the device being utilized.

If the display is not needed (504 "No"), method 500 comprises continuing to monitor at operation 502. If the display is needed (504 "Yes"), method 500 further comprises extending a display of the wearable device at operation 506. Operation 506 may include, for example, actuating a lock such as by activating an electromagnet, allowing one or more springs to press the display into an "extended" position.

In some embodiments, each configuration (extended and recessed) may have an associated lock which must be disengaged before the display can be reconfigured. For example, a display may be locked in a recessed position via a first lock, and operation 506 may include disengaging the first lock, extending the display, and causing a second lock to lock the display in the extended position.

Once the display is extended, method 500 further comprises determining whether the display is still needed at operation 508. Operation 508 may include, for example, monitoring for specific motion patterns, button presses, and the like. For example, operation 508 may include monitoring for a motion pattern of a smartwatch associated with a user bringing their arm to rest at the user's side (suggesting that the user is no longer viewing a display of the smartwatch). As an additional example, operation 508 may include determining whether the user has pressed a "sleep" button on the device. Operation 508 may include monitoring a time elapsed since the display has been extended.

If the display is still needed (508 "Yes"), method 500 comprises continuing to monitor at operation 508. If the display is no longer needed (508 "No"), method 500 comprises retracting a display of the wearable device at operation 510. Operation 510 may include, for example, actuating one or more locks and/or powering an electromagnet to cause the display to recede into a body of the wearable device. As an example, operation 510 may include disengaging a locking mechanism that was holding the display in the "extended" position, causing one or more spring forces to draw the display into a "recessed" position within the device. As another example, a spring force may be pressing the display into the "extended" position, and operation 510 may include disengaging the locking mechanism and powering an electromagnet to cause an electromagnetic force to overcome the spring force, withdrawing the display into the "recessed" position. Once the display has been returned to the recessed position, method 500 may return to monitoring at operation 502.

In some embodiments, the system may be configured to learn usage trends over time and modify a default state of the display based on the usage trends. As an illustrative example, during a given day, a user may utilize a wearable device 100 times (100 "utilizations") and a danger may be detected twice (two "danger instances"). In response, an example system may set a default state of a display to "extended." This may reduce frequency of moving (i.e., extending and/or retracting) the display of the device, which may reduce power consumption (as moving the display may require powering one or more electromagnets), wear on components, etc. Similarly, a user may utilize a wearable device five times and a danger may be detected ten times. In response, an example system may set the default state of the display to "recessed." This may increase protection of the display with relatively minimal cost in terms of power consumption/user experience.

In some instances, a ratio of danger instances to utilizations may be utilized to determine a default state. Such a ratio may enable balancing interests of power conservation and display protection. For example, the display may be in a default "extended" state so long as the ratio of danger instances to utilizations is below 0.2.

Figure 6:
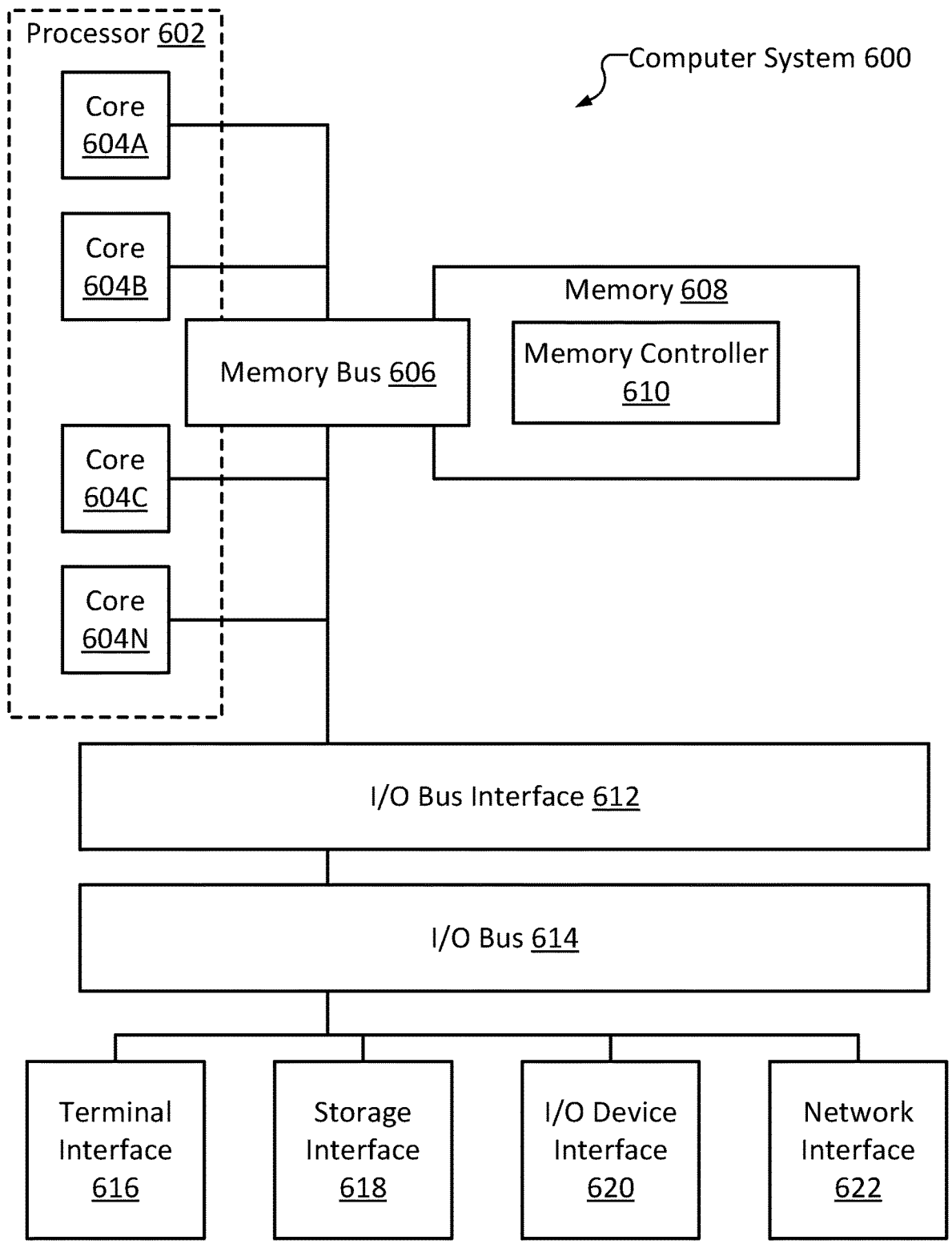
FIG. 6 is a high-level block diagram of an example computer system that may be used in implementing embodiments of the present disclosure.

FIG. 6 is a high-level block diagram of an example computer system that may be used in implementing embodiments of the present disclosure. Referring now to FIG. 6, shown is a high-level block diagram of an example computer system 600 that may be configured to perform various aspects of the present disclosure, including, for example, methods 300, 400, and/or 500. The example computer system 600 may be used in implementing one or more of the methods or modules, and any related functions or operations, described herein (e.g., using one or more processor circuits or computer processors of the computer), in accordance with embodiments of the present disclosure. In some embodiments, the major components of the computer system 600 may comprise one or more CPUs 602, a memory subsystem 608, a terminal interface 616, a storage interface 618, an I/O (Input/Output) device interface 620, and a network interface 622, all of which may be communicatively coupled, directly or indirectly, for inter-component communication via a memory bus 606, an I/O bus 614, and an I/O bus interface unit 612.

The computer system 600 may contain one or more general-purpose programmable processors 602 (such as central processing units (CPUs)), some or all of which may include one or more cores 604A, 604B, 604C, and 604N, herein generically referred to as the CPU 602. In some embodiments, the computer system 600 may contain multiple processors typical of a relatively large system; however, in other embodiments the computer system 600 may alternatively be a single CPU system. Each CPU 602 may execute instructions stored in the memory subsystem 608 on a CPU core 604 and may comprise one or more levels of on-board cache.

In some embodiments, the memory subsystem 608 may comprise a random-access semiconductor memory, storage device, or storage medium (either volatile or non-volatile) for storing data and programs. In some embodiments, the memory subsystem 608 may represent the entire virtual memory of the computer system 600 and may also include the virtual memory of other computer systems coupled to the computer system 600 or connected via a network. The memory subsystem 608 may be conceptually a single monolithic entity, but, in some embodiments, the memory subsystem 608 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 608 may contain elements for control and flow of memory used by the CPU 602. This may include a memory controller 610.

Although the memory bus 606 is shown in FIG. 6 as a single bus structure providing a direct communication path among the CPU 602, the memory subsystem 608, and the I/O bus interface 612, the memory bus 606 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 612 and the I/O bus 614 are shown as single respective units, the computer system 600 may, in some embodiments, contain multiple I/O bus interface units 612, multiple I/O buses 614, or both. Further, while multiple I/O interface units are shown, which separate the I/O bus 614 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
monitoring an environment of a device;
monitoring sudden motion of the device using an accelerometer or a proximity sensor;
detecting, based on the monitoring the environment of the device and based on monitoring sudden motion of the device, a danger to a display on the device; and
retracting, based on the detecting, the display from an extended configuration into a recessed configuration in a body of the device, wherein the display has a variable default mode setting configurable between the extended configuration and the recessed configuration, wherein retracting comprises applying a magnetic force to the display by a magnet within the device.

2. The method of claim 1, wherein applying the magnetic force comprises powering an electromagnet, wherein the electromagnet applies the magnetic force to the display.

3. The method of claim 1, wherein the retracting causes a locking mechanism to engage, locking the display in the recessed configuration.

4. The method of claim 1, further comprising:
determining that a user wishes to interact with the device; and
returning, based on the determining, the display to the extended configuration.

5. The method of claim 4, further comprising detecting that the display is still in danger, wherein the returning occurs in spite of the detecting that the display is still in danger.

6. The method of claim 1, further comprising:
determining that no danger to the display remains; and
returning, based on the determining, the display to the extended configuration.

7. The method of claim 1, further comprising:
monitoring usage of the device; and
training, based on the usage, a machine learning model to predict usage of the device based on the environment.

8. The method of claim 1, wherein:
the monitoring includes receiving sensor data from a plurality of sensors; and
the detecting includes:
inputting the sensor data into a machine learning model;
receiving an output from the machine learning model; and
detecting, based on the output, the danger to the display.

9. The method of claim 6, wherein the detecting is performed via an external device.

10. The method of claim 1, further comprising retracting, based on the detecting, a band display into a band of the device.

11. A method, comprising:
monitoring an environment of a device;
monitoring motion of the device using a proximity sensor;

detecting, based on the monitoring the environment of the device and based on monitoring motion of the device, a user intent to utilize a display on the device; and extending, based on the detecting, the display from a default recessed configuration in a body of the device into an extended configuration, wherein extending comprises applying a magnetic force to the display by a magnet within the device.

12. The method of claim 11, wherein the extending includes applying the magnetic force comprises powering an electromagnet to apply the magnetic force to the display.

13. The method of claim 11, wherein the extending causes a locking mechanism to engage, locking the display in the extended configuration.

14. The method of claim 11, further comprising:
determining that the user is no longer utilizing the display; and
returning, based on the determining, the display to the recessed configuration.

15. The method of claim 11, further comprising:
determining that a danger to the display is present; and
returning, based on the determining, the display to the recessed configuration.

16. The method of claim 11, further comprising:
monitoring usage of the device; and
training, based on the usage, a machine learning model to predict usage of the device based on the environment.

17. The method of claim 3, further comprising:
manually unlocking the display from the recessed configuration using a button on the device.

18. The method of claim 1, further comprising:
manually moving the display between the extended configuration and the recessed configuration using a button on the device.

19. The method of claim 4, wherein the determining that the user wishes to interact with the device comprises determining that the device is awakened by the user.

20. The method of claim 7, wherein the training the machine learning model comprises inputting sensor data into the machine learning model, receiving an output that includes a prediction of whether a user is about to utilize the device, determining whether the user utilized the device, and revising the machine learning model based on a comparison between the prediction and the monitored usage data.

* * * * *